UNITED STATES PATENT OFFICE 2,593,437

MANUFACTURE OF UNSATURATED ALDEHYDES

Eric Paul Goodings, Chadderton, and David James Hadley, Epsom Downs, England, assignors to The Distillers Company Limited, Edinburgh, Scotland, a British company No Drawing. Application August 12, 1949, Serial No. 110,028. In Great Britain December 23, 1946

12 Claims. (Cl. 260—604)

This application relates to improvements in and a process for the oxidation of olefines and the manufacture therefrom of unsaturated aldehydes and refers in particular to the oxidation of propylene and isobutene to acrolein and alpha-methacrolein respectively with molecular oxygen by means of a catalyst and is a continuation in part of our patent applications Serial Number 790,443, filed December 8, 1947, and Serial Number 32,546, filed June 11, 1948, both abandoned.

In the prior U. S. A. patent specification No. 2,383,711 there is described a process for the oxidation of olefines such as propylene by means of air or gases containing molecular oxygen, that is free oxygen, to form the corresponding aldehydes in which metal selenites and tellurites are used as catalysts. As metal tellurites and selenites are specified besides the more complex ones those of silver, lead, iron, cobalt, nickel, mercury, barium, calcium, sodium and potassium. Silver selenite is the catalyst to which preference is given. The life of even the preferred catalyst is indicated as a very limited one and the addition thereto of so called promoters is suggested which are supposed to stabilise said catalysts. Such promoters are amongst others oxides of manganese, nickel, zinc and, in particular, copper.

It has been found now on testing the said known catalysts for the production of acrolein and methacrolein that the rate of conversion rapidly decreases after the start. When silver selenite alone is used as catalyst its catalytic activity ceases almost completely after a very short time. This rapid decrease has been described also in the above named U. S. A. patent specification. The concurrent use of a so called promoter, such as copper oxide, does not prevent the initial rapid decline in the activity of the catalyst, but leads soon to a gradually diminished activity which then persists for some time which, however, is fairly limited.

It is an object of this invention to oxidise propylene and isobutene at a steady rate with a catalyst which does not lose its activity for a long time.

According to the present invention there is provided a process for the manufacture of acrolein and alpha-methacrolein respectively by the catalytic oxidation of propylene with gases containing free oxygen, wherein the catalyst comprises elementary selenium and one or more of the following: copper, the oxides of copper and copper compounds which are reducible to the metal under the reaction conditions.

The chemical constitution of the catalyst is likely to alter as the reaction proceeds due to the action of the gaseous mixture. This is clearly indicated by the colour changes which are observed to take place, e. g. when copper oxide is the material used. If the catalyst comprises reducible compounds such as cuprous or cupric oxide they may be reduced during the reaction by the action of the olefine-oxygen gas mixture in the presence of selenium, or they may be reduced by a separate preliminary treatment at 200 to 400° C. with hydrogen, or the reacting gas mixture containing propylene or isobutene or similar gas mixtures in the absence of selenium. In the latter case the separate preliminary treatment causes an increase in the activity of the catalyst, compared with that obtained without the said pre-treatment.

Preferably, according to this invention, copper oxide is used in conjunction with elementary selenium as contact material. The copper oxide is easily generated from copper nitrate by ignition. The active catalyst may be obtained from the copper oxide thus produced by passing thereover the olefine-molecular oxygen gas mixture in the presence of elementary selenium at reaction temperatures or by subjecting the metallic components of the catalyst by which is understood the respective compound present of copper, to a separate preliminary treatment by means of hydrogen or a mixture of the olefine or similar gases with molecular oxygen in the absence of free selenium at the reaction temperature, whereby reduction takes place and whereby on subsequent introduction of elementary selenium with the reaction gas mixture an increased activity of the catalyst in the oxidation of the olefines and the production therefrom of the corresponding unsaturated aldehydes is attained.

The elementary selenium may be introduced into the reaction zone in the vaporised form while the reaction is proceeding, or it may be present in the reaction zone in the form of elementary selenium in mixture with the other component or components of the contact mass. Alternatively, it may be generated in situ from one or more selenides which dissociate under the reaction conditions with the formation of elementary selenium. Selenides of metals which dissociate to a moderate extent only under the reaction conditions are particularly useful. Such selenides are for instance, silver selenide, antimony selenide and cobalt selenide. It is to be understood, however, that the selenides which may be used for carrying out the process of the invention are not limited to those named.

Although copper selenide is very reactive its use has proved to be economically not very suitable as its dissociation at the reaction temperature is very high. In consequence the catalytic activity does not last as long as that of others of the above named selenides, when copper selenide mixed with the other solid compounds of the contact material is used. The use of copper selenide in the contact mass, on the other hand, makes the addition thereto of other copper compounds unnecessary since by the dissociation of the selenide and by interaction with the reaction gases the active metal compound is formed.

It has further been found that when selenium is mixed in the free state with other component or components of the contact mass, that the catalyst remains active for a long period after which time its activity gradually diminishes, although the selenium content in the catalyst mass has only slightly decreased. By subsequently adding selenium vapours to the mixture of the reaction gases the efficiency of the contact mass is restored and its life prolonged very considerably.

The proportion of the copper to the selenium may vary within very wide limits.

The catalytic substances are preferably applied deposited on suitable supports such as asbestos, pumice or the like. When selenium is introduced into the reaction zone in the vaporised form only the carrier substance serves as support for the compound of copper only, at any rate initially.

The reaction temperatures lie within the range of 180 to 400° C., the most favourable being from about 300 to 350° C. Too high a temperature tends to drive off the elementary selenium from the reaction zone too rapidly or causes any selenide present to dissociate too speedily.

As free gases containing oxygen may be used such as air or mixtures of oxygen with inert gases such as carbon dioxide, nitrogen and steam. Oxygen gas such as commercial oxygen or oxygen of high degree of concentration may also be used. The proportion of molecular oxygen to the olefine may vary within wide limits. When air is used the proportion may be between 2 to 15 parts by volume of the olefine to 98 to 85 parts by volume of air. With gas mixtures having a greater oxygen concentration than air the relative proportion may be adjusted accordingly. It may be useful to regulate this proportion in such a way that the ratio of the olefine to oxygen is sufficiently low in order to avoid risks of explosions. It has been found, for instance, that by using mixtures which contain not substantially more than about 2% by volume of the olefine irrespective of the concentration of the oxygen such dangers are obviated. By the addition of inert gases or vapours to the reacting mixtures the ratio of the various components may be varied within wide limits in order to produce high conversion and efficiency provided that suitable precautions against explosions are taken. By conversion is understood the ratio of olefine oxidised to olefine fed, whilst by the term efficiency is meant ratio of aldehyde produced to olefine reacted. The explosion risk may also be avoided by using a greatly preponderating amount of the olefine and only a small proportion of the free oxygen. By adding such diluting gas or vapour as carbon dioxide or steam, and thereby decreasing the explosion risks the further advantage is gained that these added gases or vapours can be removed without difficulty from the resulting reaction mixture, for instance by washing out or condensation whereupon the unreacted olefine in admixture with oxygen remains behind in a state of high purity and concentration. This mixture may then be used again by passing it over the contact mass if desired after replenishment of one or both constituents. This latter case arises mainly when oxygen of high concentration has been used for the oxidation reaction.

As the selenium condenses easily on cooling at a moderately high temperature the reaction equipment may be disposed with advantage in such a manner that the selenium vaporised and carried away by the current of the gaseous reaction mixture is deposited in a part of the reaction equipment, e. g. the reactor tube, which is kept cool. This deposit may subsequently be vaporised by heating this part of the equipment whilst the direction of the gas mixture current is reversed and the part from where the selenium has been vaporised initially is kept cool and thus serves as a trap for the selenium issuing from the reaction zone.

Products resulting from the oxidation process according to this invention are acrolein and alphamethacrolein which can be recovered from the gaseous reaction mixture for instance by scrubbing the reaction mixture with appropriate media such as water, or by cooling the gaseous reaction mixture and thereby freezing out the aldehydes, or the like.

The process of the invention may be carried out batchwise or in a continuous manner. In the latter case the oxidation is effected advantageously with the use of air until the steady state is attained. The gaseous reaction mixture is then scrubbed in order to remove carbon dioxide and aldehyde produced by the passage over the contact mass from the gases leaving the reactor whereupon a predetermined part of the scrubbed gas is vented and the remainder is recycled. The composition of the inlet gas and the ratio of recycled to vented gas can be varied to give any desired composition of the gas mixture entering the reaction zone in the steady state which will not be obtained immediately, but only after circulation has been in progress for some time, which depends on the design and size of the equipment. The steady state obtains when the composition of the reaction mixture at any point in the circulating system does not change with time. When carbon dioxide is used as inert diluting gas for the molecular oxygen it is advantageous to remove only part of the carbon-dioxide from the gaseous reaction mixture and recycle the rest including the unconverted olefine contained therein.

From the time onward when the steady state is reached fresh oxygen is introduced as oxygen gas or in the form of oxygen in admixture with, or diluted by gases inert under reaction conditions which can be and are removed by subsequent treatment. Such a diluting gas is for instance carbon dioxide which is removed, e. g. by scrubbing with caustic alkali solution. The olefine used by the reaction is replaced and the initial concentration is maintained by the addition to the gas mixture of fresh olefine.

When, however, an olefine-gas mixture containing about 2% by volume of the olefine is used it has been found that the conversion of the olefine is so great that a recycling of unconverted olefine becomes uneconomical and can be dispensed with.

The isobutene which forms one of the olefines to be treated according to the process of the present invention has become available in large quantities by the cracking of higher hydrocarbons, mineral oils and the like so that by the process of this invention alpha-methacrolein becomes easily accessible.

The following examples illustrate the way in which the process of the invention may be carried out in practice:

EXAMPLE 1

16.0 grams of silver selenide and 7.5 grams of copper oxide prepared by heating copper nitrate to 450° C. were ground together in a mortar. Sufficient water was added to form a thin paste which was then washed into a slurry of 20 grams woolly asbestos in water. The mass was stirred to obtain a homogeneous coating of the silver selenide and copper oxide on the carrier, and dried to 150° C. It was then teased out and placed in a catalyst tube 1½″ I. D. made of Pyrex (registered trade-mark) glass. The tube was heated in an electric furnace so that the temperature of its outer wall was 350° C. and through it was passed a mixture of 11.25 litres/hour of air and 1.25 litres/hour of propylene.

The issuing gas was scrubbed with water to remove the acrolein and it was found that 15% of the propylene was converted to acrolein and 4% to carbon dioxide. The rate of production of acrolein did not decrease over a period of more than 25 hours.

EXAMPLE 2

4.6 grams of powdered selenium and 7.5 grams of copper oxide were deposited on 20 grams asbestos in the manner previously described.

At 300° C. using a flow of 22.5 litres/hour of air and 2.5 litres/hour of propylene, 7% of the latter was converted to acrolein and 1% to carbon dioxide.

The conversion was increased by prolonging the contact time of the reacting gas mixture for instance, by slowing down the rate of flow or by increasing the amount of catalyst.

EXAMPLE 3

180 cc. pumice particles ¼–⅛″, were moistened with a solution of 50 grams crystalline copper nitrate in 20 cc. water, dried and ignited in a stream of air at 450° C. The impregnated pumice was placed in a Pyrex tube with a small open glass vessel containing 5 grams selenium close to it. The tube was heated to 500° C. and a stream of nitrogen (50 litres/hour) passed successively over the selenium and the pumice for 20 minutes. In this way about 2 grams selenium was deposited on the pumice.

On passing 12.5 litres/hour of a mixture of 10% propylene in air over the catalyst at 325° C., 12% of the propylene was converted to acrolein and 5% to carbon dioxide. After seven hours the acrolein was still being produced at the same rate.

EXAMPLE 4

210 grams pumice were immersed in a boiling mixture of 100 grams of copper nitrate, —$Cu(NO_3)_2.3H_2O$— and 70 ccs. of water. The mixture was then dried and ignited at 450° C. The product thus obtained was moistened with 24 cc. of water after which 10 grams of powdered selenium were well distributed over said product.

12.5 litres per hour of a mixture containing 10% propylene and 90% of air were passed over said catalyst at 320° C. The yield of acrolein after 3 days' duration was found to amount to 20% of the propylene used. At the same time 5% of the propylene was converted into carbon dioxide. The run was continued and the yield remained practically stationary for about 8 days, after which time it began to decrease fairly rapidly. After that time selenium vapours were introduced by passing the entering gas stream over a porcelain boat charged with selenium and heated to practically the same temperature as the contact mass i. e. 320° C. The activity of the contact mass soon rose to the previous level and remained at this level for more than a month.

The activating effect obtained by the preliminary treatment of the metal components of the catalyst is shown in the following example.

EXAMPLE 5

2 runs were made under similar conditions, using copper oxide on pumice, which was prepared as described in Example 4, except that only 25 grams of copper nitrate were used. In the one case the copper oxide-pumice mixture was mixed with selenium and used without any further treatment. In the other case copper oxide on the pumice support was subjected in the absence of selenium for several hours to a current of 10% propylene and 90% of air at 325° C. The product was then mixed with the same amount of selenium which was used in the first case. The 10% propylene and 90% air-mixture was then passed at 325° C. over the thus prepared catalysts with a contact time in both cases of 90 secs.

The following table shows the results obtained thereby:

|  | CuO untreated | CuO pretreated |
| --- | --- | --- |
| Per cent propylene converted to acrolein | 8.3 | 28.9 |
| Per cent propylene converted to carbon dioxide | 4.2 | 14.5 |

EXAMPLE 6

210 grams equal to 360 cc. of pumice of 8 to 20 mesh size was impregnated with copper oxide by heating to about 150° and pouring a boiling solution of 100 grams of copper nitrate $(Cu(NO_3)_2.3H_2O)$ in 70 cc. of water on to it. Excess of liquid was drained off and the charged pumice then dried and ignited at 450° C.

60 grams of the product thus prepared equal to about 100 cc. was moistened with 6 cc. of water 2.5 grams of powdered selenium was then distributed over it by thorough agitation whereby a uniform coating of selenium on the granules was obtained.

The catalyst was placed in a vertical reactor made of Pyrex glass and having an internal diameter of 9 mm. and heated electrically to about 280° C. A stream of a mixture of 10% by volume of isobutene and 90% of air was passed at a rate of 12.5 litres per hour first over a boat charged with selenium and kept at about the same temperature and then over the catalyst. About 10% of the isobutene used was converted into alpha-methyl acrolein and about 4% to carbon dioxide. The methyl acrolein was recovered from the reaction mixture by scrubbing with water and subsequent fractional distillation of its aqueous solution.

A catalyst containing the selenium distributed thereon in powder form will gradually lose its activity, if the selenium concentration of the catalyst is not maintained by its addition either continuously or intermittently in the vaporised form. If the selenium concentration is thus kept up however the high activity of the catalyst lasts for several months.

EXAMPLE 7

50 grams of a copper oxide pumice contact material prepared as described in Example 4 was placed in a helical tube made of Pyrex (registered trade-mark) glass and having an internal diameter of 8 mm., this helical glass reactor was heated to 320° C. and 12.5 litres per hour of a mixture of 10% propylene and 90% air was passed through it for 28 hours. After that time 0.02 gram per hour of selenium was added to the gas entering the solid contact mass bed by passing it over the surface of a pool of selenium in a porcelain boat and at a suitable temperature. One hour after the introduction of selenium about 2% of the propylene was being converted to acrolein. The test was continued for two days after which time 9% of the propylene was converted to acrolein and 2% to carbon dioxide. The yield could be increased by lengthening the contact time, that is by increasing the amount of solid contact material over and through which the gas mixture was passed.

We claim:

1. Process for the manufacture of an unsaturated aldehyde selected from the group consisting of acrolein and alpha-methacrolein by the catalytic oxidation of the corresponding olefines propylene and isobutene respectively which comprises passing the olefine with molecular oxygen containing gases at temperatures between 200° and 400° C. in the presence of elementary selenium in the reaction zone over a contact material containing at least one member selected from the group consisting of copper metal, cuprous oxide and cupric oxide and recovering the unsaturated aldehyde from the reaction mixture.

2. Process according to claim 1 wherein the selenium is added to the reactant gases in the form of vapour.

3. Process according to claim 1 wherein the copper-containing contact material is distributed over an inert carrier.

4. Process according to claim 1 wherein the copper-containing contact material is subjected to a preliminary reduction treatment at elevated temperatures with hydrogen.

5. Process according to claim 1 wherein the copper-containing contact material is subjected to a preliminary treatment at 200° to 400° C. with the mixture containing the olefine to be oxidised and the oxygen-containing gases before selenium is introduced into the reaction zone.

6. Process according to claim 1 wherein the selenium is generated in the reaction zone from decomposable metal selenides selected from the group consisting of the selenides of silver, copper, cobalt and antimony, which had been admixed initially with the copper containing contact material.

7. Process according to claim 1 wherein the proportion in the mixture of gaseous reactants is two per cent of olefine to 98 per cent of air.

8. Process according to claim 1 wherein the olefine-oxygen mixture is diluted with carbon dioxide to keep the mixture outside the explosion limits.

9. Process according to claim 1 wherein the olefine-oxygen mixture is diluted with steam.

10. Continuous process according to claim 1 wherein the olefine-containing reaction mixture is recycled through the reaction zone with the addition of fresh oxygen diluted with an inert gas, a fraction of the reaction mixture corresponding to the said addition is blown off after leaving the reaction zone and after having recovered therefrom the unsaturated aldehyde contained therein, until the steady state in the circulation system has been attained, and subsequently the circulating gas mixture is replenished with practically pure oxygen and fresh olefine after removal from the reaction mixture of the unsaturated aldehyde without blowing off any of the gaseous mixture.

11. Continuous process according to claim 9 wherein the replenishing oxygen added subsequently is mixed with a removable gaseous inert diluent which is removed when the aldehyde is recovered.

12. Continuous process according to claim 1, wherein the mixture comprising olefine and molecular oxygen is passed over the contact material in association with elementary selenium, the reaction mixture leaving the reaction zone is scrubbed for the removal of the unsaturated aldehyde produced, a fraction of the scrubbed gas mixture is vented and the remainder of said gas mixture recycled through the reaction zone after the olefine and the molecular oxygen have been replenished.

ERIC PAUL GOODINGS.
DAVID JAMES HADLEY.

REFERENCES CITED

The following references are of record in the file of this patent:

UNITED STATES PATENTS

| Number | Name | Date |
|---|---|---|
| 1,103,017 | Ellis | July 7, 1914 |
| 2,366,724 | Gardner | Jan. 9, 1945 |
| 2,383,711 | Clark et al. | Aug. 28, 1945 |

OTHER REFERENCES

Abegg et al.: "Handbuch der Anorg. Chemie," Band IV, 1st abst., 1st half (Group VI), page 740 (1927), S. Hirzel, Leipzig.